United States Patent [19]

Takada et al.

[11] Patent Number: 4,920,829
[45] Date of Patent: May 1, 1990

[54] HYDRAULIC PRESSURE CONTROL DEVICE FOR AUTOMATIC TRANSMISSION FOR VEHICLE INCLUDING REVERSE STAGE AND LOCK-UP CLUTCH CONTROL SYSTEMS

[75] Inventors: Mitsuru Takada; Hiroshi Itoh, both of Toyota; Tokuyuki Takahashi, Aichi, all of Japan

[73] Assignee: Toyota Jidosha Kabushiki Kaisha, Aichi, Japan

[21] Appl. No.: 302,254

[22] Filed: Jan. 27, 1989

[30] Foreign Application Priority Data

Feb. 17, 1988 [JP] Japan .................................. 63-34598

[51] Int. Cl.$^5$ .............................................. B60K 41/06
[52] U.S. Cl. ........................................ 74/868; 74/869; 74/878
[58] Field of Search ................. 74/866, 867, 868, 869, 74/878

[56] References Cited

U.S. PATENT DOCUMENTS

| 3,937,107 | 2/1976 | Lentz | 74/868 X |
| 4,033,203 | 7/1977 | Hirosawa et al. | 74/869 |
| 4,136,584 | 1/1979 | Ishikawa | 74/867 |
| 4,290,325 | 9/1981 | Nishimura | 74/878 X |
| 4,307,631 | 12/1981 | Iwanaga et al. | 74/878 X |
| 4,488,457 | 12/1984 | Nishimura et al. | 74/878 X |
| 4,545,265 | 10/1985 | Abo et al. | 74/868 |
| 4,744,269 | 5/1988 | Greene et al. | 74/868 |
| 4,827,807 | 5/1989 | Hayakawa et al. | 74/878 X |

FOREIGN PATENT DOCUMENTS

| 2915434 | 10/1980 | Fed. Rep. of Germany | 74/878 |
| 58-99543 | 6/1983 | Japan | 74/878 |
| 60-37446 | 2/1985 | Japan . | |
| 2109064 | 5/1983 | United Kingdom | 74/878 |

Primary Examiner—Dwight G. Diehl
Assistant Examiner—Chris Campbell
Attorney, Agent, or Firm—Oliff & Berridge

[57] ABSTRACT

A hydraulic pressure control device for an automatic transmission for a vehicle, including a first, a second and a third hydraulic pressure control valve, wherein the third hydraulic pressure control valve cooperates with the first hydraulic pressure control valve to control switching over of a certain operation of the automatic transmission such as engagement and disengagement of a torque converter lock-up clutch during forward traveling of the vehicle, and also cooperates with the second hydraulic pressure control valve to selectively prevent setting up of the reverse stage when a manual shift valve is set to the reverse range while the vehicle is traveling forward.

6 Claims, 5 Drawing Sheets

HYDRAULIC PRESSURE CONTROL DEVICE FOR AUTOMATIC TRANSMISSION FOR VEHICLE INCLUDING REVERSE STAGE AND LOCK-UP CLUTCH CONTROL SYSTEMS

BACKGROUND OF THE INVENTION

1. Field of the Invention

The present invention relates to a hydraulic pressure control device for an automatic transmission for a vehicle such as an automobile, and more particularly, relates to a hydraulic pressure control device having a reverse stage engagement prevention system for preventing the automatic transmission being set to the reverse stage under a certain vehicle operating condition such as forward traveling at or above a certain speed.

2. Description of the Prior Art

In the art of transmission for a vehicle such as an automobile it has already been proposed to incorporate in the hydraulic pressure control device of the automatic transmission a reverse stage prevention system for the purpose of failsafe such as described above, so that, even if the driver mistakenly carries out a manual shift change operation toward the reverse stage while the vehicle is traveling forward, the automatic transmission is not shifted to the reverse stage.

Such an art is disclosed in Japanese Patent Laying-open Publication Sho 60-37446 (1985). In this prior art, the reverse stage prevention system has a reverse stage disabling valve of a hydraulically operated type for carrying out a switching over operation according to supply or draining of a signal hydraulic pressure thereto, so as selectively to prevent supply of hydraulic pressure to a friction engaging device for setting up the reverse stage and to connect said friction engaging device to a drain. In such a prior art the supply or draining of the signal hydraulic pressure to said reverse stage disabling valve is controlled by a particular solenoid valve. Therefore, the hydraulic pressure control device having such a reverse stage prevention system requires an additional and exclusive solenoid valve for the reverse stage disabling valve, as compared with the transmission in which such a reverse stage prevention system is not provided. Such an addition of an exclusive solenoid valve not only increases the cost of the transmission but also increases the size and weight of the transmission control system, and reduces the operating reliability by increasing the number of items which require preventative maintenance.

SUMMARY OF THE INVENTION

The object of the present invention is to provide an improved hydraulic pressure control device for an automatic transmission for a vehicle, in which the reverse stage prevention can be carried out without requiring any addition of an exclusive solenoid valve such as described above.

The above-mentioned object is achieved according to the present invention by a hydraulic pressure control device for an automatic transmission for a vehicle, comprising: a manual shift valve for selecting a forward range in which at least one forward speed stage is enabled and a reverse range in which a reverse stage is enabled; a first hydraulic pressure control valve having a first and a second control signal port and controlling switching over of an operation of the automatic transmission according to conversion between supply and non supply of a first and a second signal hydraulic pressure to said first and said second control signal port, respectively, said second signal hydraulic pressure being available in a certain forward speed stage or stages but not available in the reverse stage, said first hydraulic pressure control valve being reactive to the conversion between supply and non supply of said first signal hydraulic pressure when and only when said second signal hydraulic pressure is supplied; a second hydraulic pressure control valve having a third control signal port and selectively interrupting transmission of a third signal hydraulic pressure according to conversion between supply and non supply of said first signal hydraulic pressure to said third control signal port, said third signal hydraulic pressure being available when and only when the manual shift valve is set to the reverse range and serving to set up the reverse stage; and a third hydraulic pressure control valve for controlling the conversion between supply and non supply of said first signal hydraulic pressure so that in the forward speed stage at which said second signal hydraulic pressure is available said operation of the automatic transmission is selectively switched over and in the reverse range the setting up of the reverse stage is selectively interrupted.

According to the above construction, said third hydraulic pressure control valve is combined with said first hydraulic pressure control valve to provide a first control system for switching over said operation of the automatic transmission on the one hand, while on the other hand, is combined with said second hydraulic pressure control valve to provide a second control system for selectively preventing setting up of the reverse stage with no interference between the operations of the two control systems.

Therefore, according to the present invention it is not necessary to additionally provide a signal hydraulic pressure control valve in order to obtain a reverse stage engagement prevention effect, and therefore an increase in the costs, size, weight and the number of items requiring preventative maintenance due to the incorporation of the reverse stage engagement prevention system is avoided while the reliability of the reverse stage engagement prevention system is improved.

It would be desirable that said first hydraulic pressure control valve is a lock-up clutch relay valve for controlling engagement and disengagement of a lock-up clutch for a torque converter incorporated in the automatic transmission.

Further, said third hydraulic pressure control valve may be a solenoid valve having a drain port which is normally closed and selectively opened when energized to drain said first signal hydraulic pressure so as to effect the conversion from supply to non supply of said first signal hydraulic pressure to said first and said third control signal port.

Alternatively, said third hydraulic pressure control valve may be a solenoid valve having a drain port which is normally opened to drain said first signal hydraulic pressure so as not to supply said first signal hydraulic pressure to said first and said third control signal port and selectively closed when energized so as to effect the conversion from non supply to supply of said first signal hydraulic pressure to said first and said third control signal port.

Further, the hydraulic pressure control device may further comprise a three-way check valve which selectively conducts either said first signal hydraulic pressure or said third signal hydraulic pressure delivered through said second hydraulic pressure control valve to said third control signal port of said second hydraulic pressure control valve.

Alternatively, said second hydraulic pressure control valve may have a fourth control signal port opposite to said third control signal port, and the hydraulic pressure control device may further comprise a three-way check valve which conducts either said third signal hydraulic pressure delivered through said second hydraulic pressure control valve or a hydraulic pressure available in said certain forward speed stage or stages to said fourth control signal port of said second hydraulic pressure control valve.

BRIEF DESCRIPTION OF THE DRAWINGS

In the accompanying drawings.

DESCRIPTION OF THE PREFERRED EMBODIMENTS

The present invention will now be described in detail with regard to some preferred embodiments thereof with reference to the attached drawings.

Figure 1:
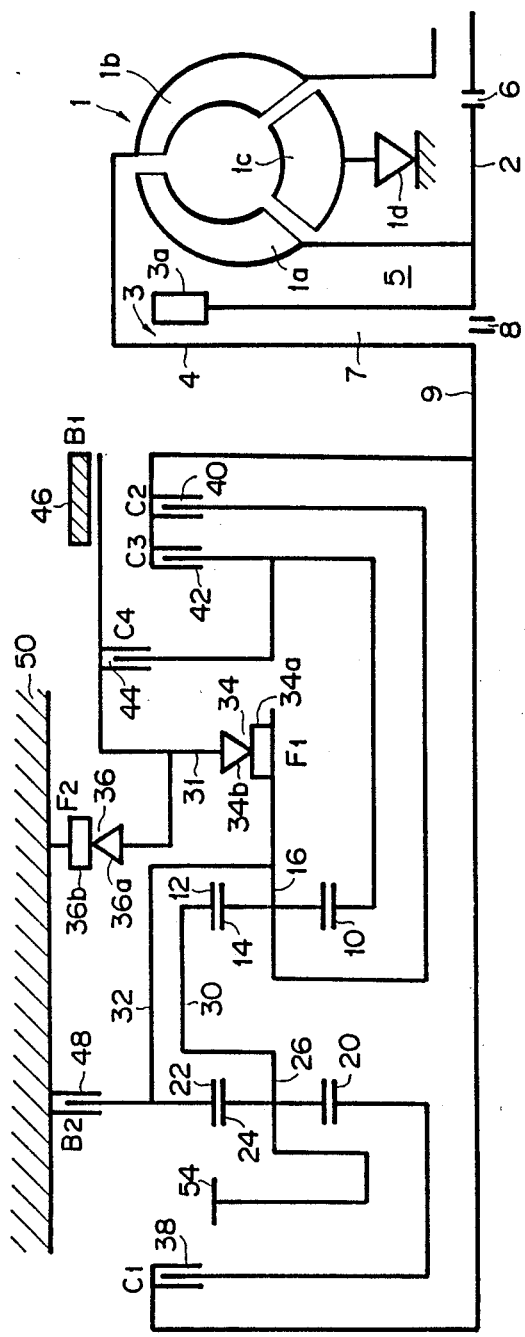
FIG. 1 is a skeleton diagram showing a combination of a torque converter with a lock-up clutch and a planetary gearwheel type speed change device of an automatic transmission for a vehicle to which the present invention is applicable.

Referring to FIG. 1, the reference numeral 1 designates a torque converter having a pump impeller 1a, a turbine runner 1b, a stator 1c and a one-way clutch 1d supporting the stator to be rotatable only in one rotational direction. The pump impeller 1a is connected with an engine not shown in the figure by an input shaft 2. Further, the torque converter 1 includes a lock-up clutch 3 including a clutch disk 3a which is selectively pressed against a turbine housing 4 by a hydraulic pressure introduced into an inside space 5 of the torque converter through a port 6 so as to transmit rotational power directly between the input shaft 2 and the turbine housing 4. The clutch disk 3a is disengaged from the turbine housing 4 when a hydraulic pressure is introduced into a chamber space 7 through a port 8 while the port 6 is connected to a drain passage. The turbine housing 4 is connected with an input member 9 of a planetary gearwheel type speed change device of the following construction.

In the planetary gearwheel type speed change device, 10 is a first sun gear, 12 is a first ring gear coaxial with the first sun gear 10, 14 is one of a plurality of first planetary pinions which mesh with the first sun gear 10 and the first ring gear 12, 16 is a first carrier which supports rotatably the first planetary pinions 14, 20 is a second sun gear, 22 is a second ring gear coaxial with the second sun gear 20, 24 is one of a plurality of second planetary pinions which mesh with the second sun gear 20 and the second ring gear 22, and 26 is a second carrier which supports rotatably the second planetary pinions 24. The first ring gear 12 is coupled with the second carrier 26 by a coupling member 30, and the first carrier 16 is coupled with the second ring gear 22 by a coupling member 32.

It should be noted that here the simple planetary gearwheel mechanism which comprises the first sun gear 10, the first ring gear 12, the first planetary pinions 14, and the first carrier 16 is referred to as the first planetary gearwheel mechanism, and the simple planetary gearwheel mechanism which comprises the second sun gear 20, the second ring gear 22, the second planetary pinions 24, and the second carrier 26 is referred to as the second planetary gearwheel mechanism.

A first one-way clutch 34 and a second one-way clutch 36 are provided mutually in series between a housing 50 and the combination of the first carrier 16 and the second ring gear 22 coupled together by the coupling element 32. Here the first one-way clutch 34 is provided on the side of the first carrier 16, and the second one-way clutch 36 is provided on the side of the housing 50. In more detail, the first one-way clutch 34 has an inner race 34a connected with the first carrier 16 and an outer race 34b connected with an inner race 36a of the second one-way clutch 36 by a coupling member 31, and an outer race 36b of the second one-way clutch 36 is connected with the housing 50.

The second carrier 26 is connected with an output gearwheel 54 which acts as an output member.

The first one-way clutch 34 is engaged when the outer race 34b would rotate faster than the inner race 34a in an engine rotational direction during engine drive, and becomes free running in the relative rotation opposite to said engine rotational direction. The second one-way clutch 36 is engaged when the inner race 36a would rotate in the rotational direction opposite to said engine rotational direction relative to the outer race 36b, and becomes free running in the reversed relative rotation.

A first clutch (C1) 38 is provided between the second sun gear 20 and an input member 9 so as selectively to couple them together. A second clutch (C2) 40 is provided between the first carrier 16 and the input member 9 so as selectively to couple them together. A third clutch (C3) 42 is provided between the first sun gear 10 and the input member 9 so as selectively to couple them together. A fourth clutch (C4) 44 is provided between the first sun gear 10 and the coupling member 31 so as selectively to couple them together. The input member 9 is driven by the engine not shown in the figure in said engine rotational direction through the torque converter 1 or the lock-up clutch 3.

A first brake (B1) 46 is provided between the coupling member 31 and the housing 50 so as selectively to fix the coupling member 31 with respect to the housing 50. A second brake (B2) 48 is provided between the second ring gear 22 and the housing 50 so as selectively to fix the second ring gear 22 with respect to the housing 50.

Table 1 below summarizes the combinations of the selective engagement of the clutches and the brakes in the above described construction of the speed change device for setting up a first speed stage, a second speed stage, a third speed stage (direct drive stage), a fourth speed stage (overdrive stage), and a reverse stage. In this table, a circle indicates that the corresponding clutch, brake or one-way clutch is engaged during engine drive, and a circle in parentheses indicates that the corresponding clutch or brake is engaged when an engine braking effect is to be obtained in that speed stage.

TABLE 1

|  | C₁ 38 | C₂ 40 | C₃ 42 | C₄ 44 | B₁ 46 | B₂ 48 | F₁ 34 | F₂ 36 |
|---|---|---|---|---|---|---|---|---|
| First speed stage | o |  |  |  |  | (o) | o | o |
| Second speed stage | o |  |  | o | (o) |  |  | o |
| Third speed stage | o | o |  | o |  |  | o |  |
| Fourth speed stage |  | o | o |  | o |  |  |  |
| Reverse stage |  |  | o |  |  | o |  |  |

If the ratio of the number of teeth of the first sun gear 10 to that of the first ring gear 12 is $r_1$, and the ratio of the number of teeth of the second sun gear 20 to that of the second ring gear 22 is $r_2$, then the speed change ratios in the respective speed stages are as shown in Table 2.

TABLE 2

| | Speed Change Ratio |
|---|---|
| First speed stage | $(1 + r_2)/r_2$ |
| Second speed stage | $\{(1 + r_2)/r_2\} - \{1/r_2(1 + r_1)\}$ |
| Third speed stage | 1 |
| Fourth speed stage | $1/(1 + r_1)$ |
| Reverse stage | $-1/r_1$ |

Figure 2:
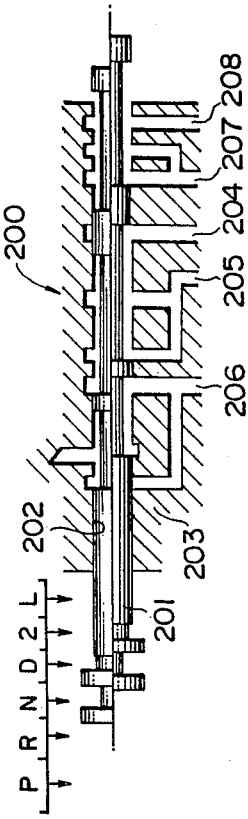
FIG. 2 is a somewhat schematical longitudinal section of a manual shift valve.

FIG. 2 shows an example of a manual shift valve 200 which itself is well known in the art. This valve has a spool element 201 received in a valve bore 204 formed in a valve housing 203 to be longitudinally slidable therealong. The valve housing is formed with an input port 204 which is constantly supplied with the so called line pressure serving as a pressure source of the hydraulic control system of the transmission, and the hydraulic pressure supplied to the input port 204 is delivered to a first output port 205 when the spool element 201 is shifted to the position of D (so called D range), to said first output port 205 and a second output port 206 when the spool element 201 is shifted to the position of 2 (so called 2 range), to said first and second output ports 205 and 206 as well as a third output port 207 when the spool element is shifted to the position of L (so called L range), and only to a fourth output port 208 when the spool element 201 is shifted to the position of R (so called R range).

Figure 3:
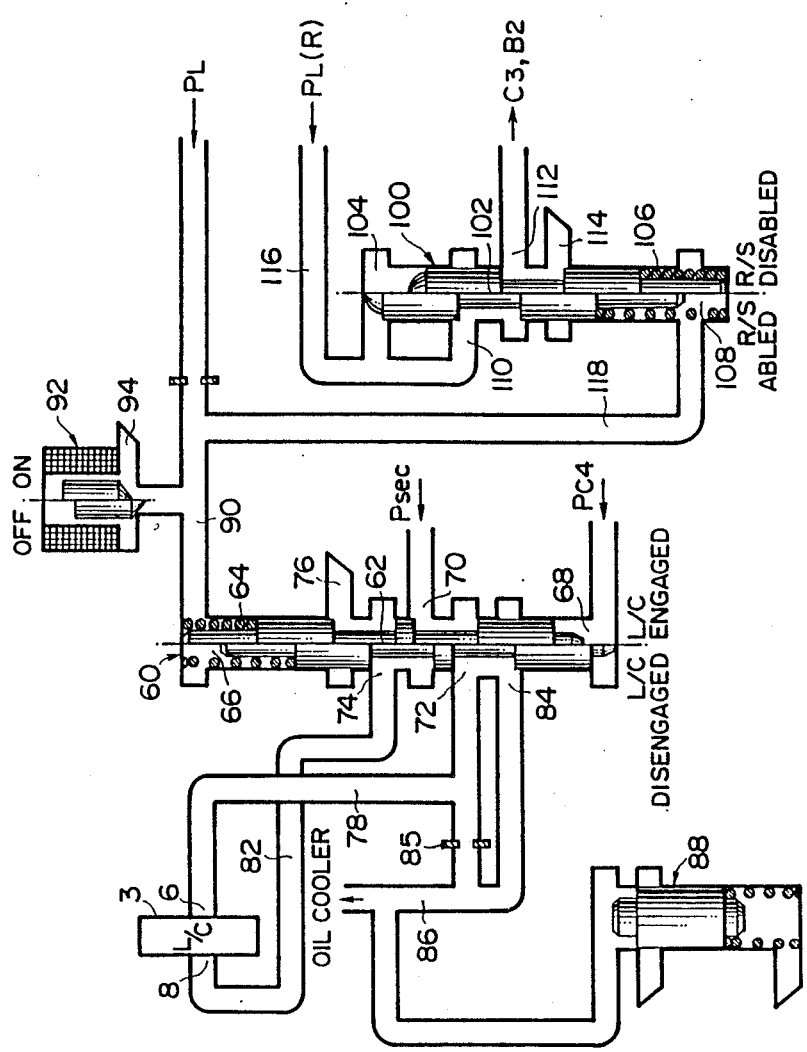
FIGS. 3 to 6 are hydraulic circuit diagrams showing several embodiments of the hydraulic pressure control device according to the present invention.

FIG. 3 shows the essential portions of one embodiment of the hydraulic pressure control device according to the present invention. In FIG. 3, 60 is a hydraulic pressure control valve which operates as a lock-up relay valve. The lock-up relay valve 60 has a spool element 62 which is urged downward in the figure by the spring force of a compression coil spring 64 and a signal hydraulic pressure supplied to a signal hydraulic pressure chamber 66 and is urged upward in the figure by a signal hydraulic pressure supplied to another signal hydraulic pressure chamber 68. When the spool element 62 is in the lowered position as shown in the leftside half portion thereof in the figure, a release port 74 is connected with a hydraulic pressure inlet port 70, while an apply port 72 is connected with an oil cooler port 84, whereas when the spool element 62 is in the raised position as shown in the rightside half portion thereof in the figure, the apply port 72 is connected with the hydraulic pressure inlet port 70, while the release port 74 is connected with a drain port 76. The hydraulic pressure inlet port 70 is supplied with a hydraulic pressure $P_{sec}$ which is slightly lower than the so called line hydraulic pressure in the transmission control hydraulic system and is called the lubrication oil pressure from a conventional secondary regulator valve not shown in the figure. The apply port 72 is connected with the port 6 for the lock-up clutch 3 by a hydraulic line 78, and the release port 74 is connected with the port 8 for the lock-up clutch 3 by a hydraulic line 82.

The lock-up clutch 3 is engaged when the hydraulic pressure is supplied to the port 6 from the apply port 72 while the port 8 is connected to a drain passage, and is disengaged when the hydraulic pressure is supplied to the port 8 from the release port 74 while the port 6 is connected to a drain passage.

Further, the apply port 72 is connected with a hydraulic line 86 leading to an oil cooler (not shown) through a throttle element 85, and the oil cooler port 84 is directly connected with the hydraulic line 86, both ports being arranged to send the operating oil to the oil cooler.

A cooler bypass valve 88, which is a hydraulic pressure relief valve, is also connected with the hydraulic line 86, and if the hydraulic pressure in the hydraulic line 86 rises above a certain value, the hydraulic pressure is reduced by a relief effect of the cooler bypass valve 88.

The so called line hydraulic pressure $P_L$ is selectively supplied as a signal hydraulic pressure to the signal hydraulic pressure chamber 66 of the lock-up relay valve 60 from a hydraulic line 90 when a solenoid valve 92 is closed. The line hydraulic pressure is also selectively supplied to the other signal hydraulic pressure chamber 68 as a signal hydraulic pressure only when the lock-up clutch 3 is to be engaged, as, for example, when the manual shift range is set to a forward range such as the D range, and the speed change stage is the second or higher speed stage. In order to satisfy such a condition, the line hydraulic pressure supplied to the signal hydraulic pressure chamber 68 may be a clutch hydraulic pressure $P_{C4}$ which is supplied to the fourth clutch (C4) 44 when it is to be engaged.

In this embodiment, the solenoid valve 92 is a normally closed solenoid valve which is closed when not energized and is opened to connect the hydraulic line 90 to a drain port 94 when energized.

Now the control of the fork-up clutch will be described.

When the manual shift valve is set to a forward range such as the D range and the speed change stage is lower than the second speed stage (in fact, the first speed stage), then the signal hydraulic pressure is not supplied to the signal hydraulic pressure chamber 68, and therefore the spool valve 62 is in the lowered position as shown in the leftside half portion thereof in FIG. 3, at least by the spring force of the compression coil spring 64, and therefore the lock-up clutch 3 is maintained in the released state. When the manual shift valve is set to a forward range such as the D range and the speed change stage is at the second or higher speed stage, then the clutch hydraulic pressure $P_{C4}$ is supplied to the signal hydraulic pressure chamber 68, and therefore a force is applied to the spool element 62 in the upward direction in the figure. In this state, if the solenoid valve 92 is not energized, and is therefore in the closed state, the line hydraulic pressure is supplied through the hydraulic line 90 to the signal hydraulic pressure chamber 66, and therefore the spool element 62 is positioned in the lower position as shown in the leftside half portion thereof in FIG. 3 by the spring force of the compression coil spring 64, and therefore the lock-up clutch 3 will also be in the released state. However, if the solenoid valve 92 is energized, and is therefore opened, the hydraulic line 90 is connected with the drain port 94, and the signal hydraulic pressure is drained from the signal hydraulic pressure chamber 66. Therefore the spool element 62 is moved upward in the figure against the spring force of the compression coil spring 64 by the signal hydraulic pressure supplied to the signal hydraulic pressure chamber 68, and is positioned in the upper position as shown in the rightside half portion thereof in the figure. Thus, the apply port 72 is connected with the hydraulic pressure inlet port 70, and the lock-up clutch 3 is engaged.

It should be noted that, if the solenoid valve 92 is subject to a failure such as a circuit break, the solenoid valve 92 will no longer open, and the lock-up clutch 3 will not be engaged. Thus, the failsafe for the operation of the lock-up clutch 3 is that it is released when the normally closed type solenoid valve 92 remains closed by a circuit break or the like. In the reverse stage, the hydraulic pressure $P_{C4}$ is not supplied to the signal hydraulic pressure chamber 68, and therefore, regardless of the opened or closed state of the solenoid valve 92 the spool element 62 is held in the lowered position at least by the compression coil spring 64, and therefore the lock-up clutch 3 will not be engaged.

Further, in FIG. 3, 100 is a reverse stage disabling valve. The valve 100 has a spool element 102 which is urged downward in the figure by a signal hydraulic pressure supplied to a signal hydraulic pressure chamber 104, and is urged upward in the figure by the spring force of a compression coil spring 106 and the signal hydraulic pressure supplied to an opposite signal hydraulic pressure chamber 108. When the spool element 102 is in the raised position as shown in the leftside half portion thereof in the figure, a servo port 112 is connected with a hydraulic pressure inlet port 110, whereas when the spool element 102 is in the lowered position as shown in the rightside half portion thereof in the figure, the servo port 112 is disconnected from the hydraulic pressure inlet port 110 and is connected with a drain port 114. The signal hydraulic pressure chamber 104 and the hydraulic pressure inlet port 110 are connected with the output port 208 of the manual shift valve shown in FIG. 2 by a hydraulic line 116, and is thereby supplied with the line hydraulic pressure when the manual shift valve is set to the reverse range to set up the reverse stage. The servo port 112 is connected with the corresponding hydraulic pressure servo chambers of the friction engaging devices in the automatic transmission which are engaged when the reverse stage is set up, which, in this embodiment, are the third clutch (C3) 42 and the second brake (B2) 48.

According to the above described construction, when the spool element 102 is in the raised position as shown in the leftside half portion thereof in FIG. 3, the servo port 112 is connected with the hydraulic pressure inlet port 110, and therefore the reverse stage is enabled, whereas when the spool element 102 is in the lowered position as shown in the rightside half portion thereof in the figure, the servo port 112 is cut off from the hydraulic pressure inlet port 110 and is connected with the drain port 114, and therefore the reverse stage is disabled.

The opposite signal hydraulic pressure chamber 108 is connected with the hydraulic line 90 by a hydraulic line 118 and is selectively supplied with the line hydraulic pressure as a signal hydraulic pressure depending on the opening and closing of the above-mentioned solenoid valve 92.

Therefore, when the solenoid valve 92 is not energized and is therefore closed, the line hydraulic pressure is supplied from the hydraulic line 90 through the hydraulic line 118 to the signal hydraulic pressure chamber 108. At this time, when the signal hydraulic pressure is being supplied to the signal hydraulic pressure chamber 104, the spool element 102 is maintained in the upper position as shown in the leftside half portion thereof in the figure by the spring force of the compression coil spring 106, and therefore the reverse stage is enabled.

On the other hand, if the solenoid valve 92 is energized and thus opens, the line hydraulic pressure in the signal hydraulic pressure chamber 108 is drained through the hydraulic line 118 and the hydraulic line 90 to the drain port 94, and therefore, when the manual shift valve is set to the reverse range, and the signal hydraulic pressure is supplied through the hydraulic line 116 to the signal hydraulic pressure chamber 104, the spool element 102 is lowered against the spring force of the compression coil spring 106 by the line hydraulic pressure of the signal hydraulic pressure chamber 104 and is positioned in the lowered position as shown in the rightside half portion thereof in the figure. Therefore, the servo port 112 is cut off from the hydraulic pressure inlet port 110 and is in turn connected with the drain port 114, and therefore the friction engaging devices for setting up the reverse stage, i.e., the third clutch (C3) 42 and the second brake (B2) 48 are not supplied with the line hydraulic pressure, and therefore the reverse stage is prevented.

Thus, the reverse stage disabling valve 100 is positively disabled by the holding of the spool element 102 in the upper position in the figure by the supply of the line hydraulic pressure to the signal hydraulic pressure chamber 108, and only when it is necessary that the automatic transmission is prepared from being shafted to the reverse stage in spite of the manual setting of the manual shift valve to the reverse range by the driver, the prevention of the reverse range is achieved simply by energizing the solenoid valve 92.

It should be noted that if the normally closed solenoid valve 92 fails to operate and remains in the closed state because of a circuit break or the like, the supply of hydraulic pressure to the signal hydraulic pressure chamber 108 is ensured, and therefore the spool element 102 is maintained in said upper position, and therefore the reverse stage disabling operation will not occur.

The solenoid valve 92 is shared by the lock-up clutch control system including the lock-up relay valve 60 and the reverse stage prevention control system including the reverse stage disabling valve 100. However, because the operational range of the solenoid valve 92 concerned with the lock-up relay valve 60 is in the forward traveling state of the vehicle with the manual shift range being set to a forward range such as the D range and the speed stage of the transmission being shifted to the second or higher speed stage, thus the hydraulic pressure $P_{C4}$ being supplied but the hydraulic pressure $P_{L(R)}$ not being supplied, and is completely separated from the operational range of the solenoid valve 92 concerned with the reverse stage disabling valve 100 in which the hydraulic pressur PC4 is not supplied and the hydraulic pressure $P_{L(R)}$ is supplied, there is no danger that the on and off operation of the solenoid valve 92 for either the lock-up relay valve 60 or the reverse stage disabling valve 100 interferes with that for the other of these two valves. In other words, when the hydraulic pressure $P_{C4}$ is not supplied, the on and off operation of the solenoid valve 92 causes no difference in the operation of the lock-up clutch 3, while on the other hand, when the hydraulic pressure $P_{L(R)}$ is not supplied, the on and off operation of the solenoid valve 92 causes no difference in the operation of the reverse state engagement prevention system. At no time the hydraulic pressure $P_{C4}$ and the hydraulic pressure $P_{L(R)}$ are simultaneously supplied. Further, in any event, the on and off operation of the solenoid valve 92 concerned with the lock-up relay valve 60 is only to control the engagement and disengagement of the lock-up clutch 3 and does not dangerously effect the operation of the vehicle.

Further, it should be noted that because the supply of hydraulic pressure to the solenoid valve 92 is shared by the supply of the signal hydraulic pressure to the lock-up relay valve 60 and the supply of the signal hydraulic pressure to the reverse stage disabling valve 100, the supply system of the signal hydraulic pressure is simplified. The supply of the hydraulic pressure may conveniently be based on the line hydraulic pressure of the hydraulic line immediately after the conventional primary regulator not shown in the figure.

Figure 4:
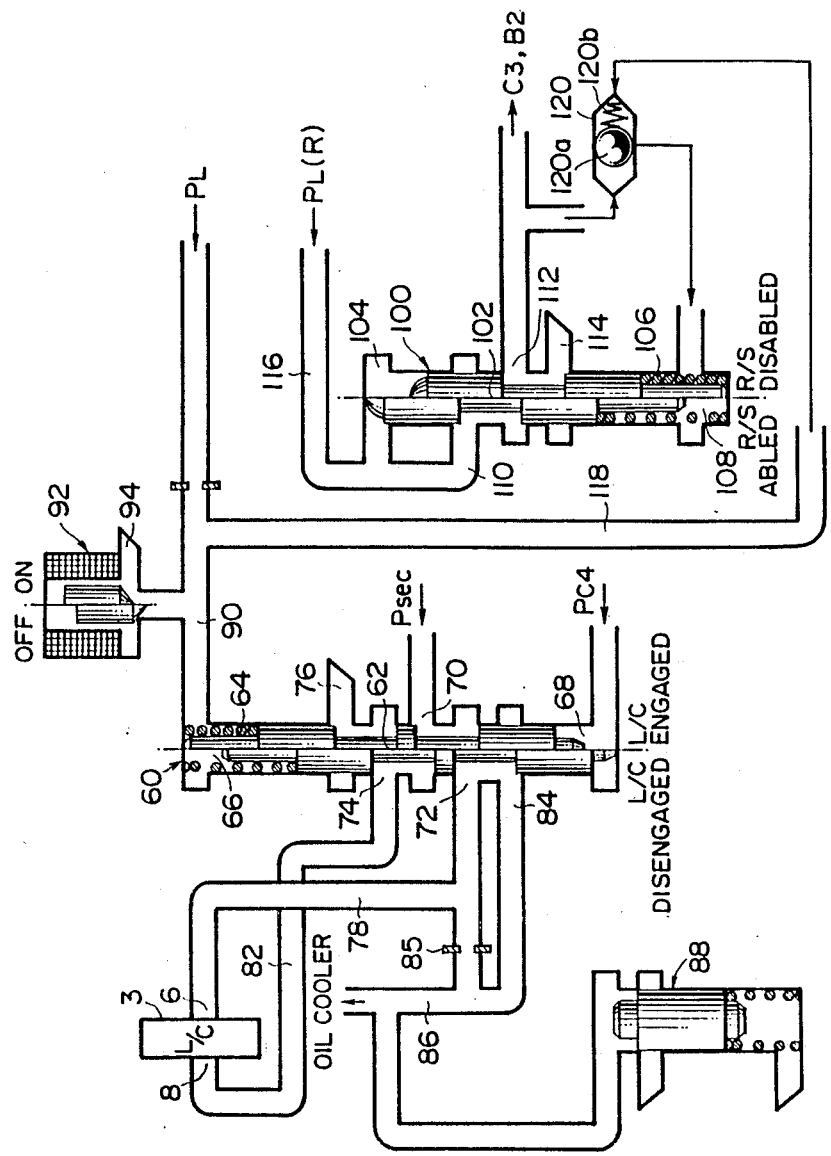

FIG. 4 shows a variant of the embodiment shown in FIG. 3. It should be noted that in FIG. 4 portions corresponding to those shown in FIG. 3 are designated by the same reference numerals as in FIG. 3. In this embodiment the signal hydraulic pressure chamber 108 of the reverse stage disabling valve 100 is selectively connected with the hydraulic line 118 or the servo port 112 through a three-way check valve 120 to be supplied with the hydraulic pressure from either of these two. The three-way check valve has a ball element 120a biased by a compression coil spring 120b leftward in the figure so that the pressure chamber 108 is kept in communication with the hydraulic line 118 in both flow directions unless the ball element 120a is biased rightward in the figure under compression of the spring 120b by the hydraulic pressure from the servo port 112 while the hydraulic pressure in the hydraulic line 118 is lost.

In this embodiment, as in the embodiment shown in FIG. 3, if the reverse stage is to be prevented when the signal pressure $P_{L(R)}$ was supplied, the solenoid valve 92 is energized and the drain port 94 is opened. Then the signal hydraulic pressure of the signal hydraulic pressure chamber 108 is drained to the drain port 94 through the three-way check valve 120 and the hydraulic lines 118 and 90, and therefore the spool valve 102 of the reverse stage disabling valve 100 is positioned in the lower position as shown in the rightside half portion thereof in the figure, and the reverse stage is prevented from being set up. On the other hand, when the solenoid valve 92 is not energized and the drain port 94 is therefore closed, the line hydraulic pressure is supplied from the hydraulic line 90 through the hydraulic line 118 and the three-way check valve 120 to the signal hydraulic pressure chamber 108, and therefore the spool valve 102 is positioned in the upper position as shown in the leftside half portion thereof in the figure regardless whether the pressure $P_{L(R)}$ is supplied or not. In this state the servo port 112 is connected with the hydraulic pressure inlet port 110, and when the line hydraulic pressure $P_{L(R)}$ is supplied, this pressure is supplied from the servo port 112 to the third clutch (C3) 42 and the second brake (B2) 48, so that the reverse stage is set up. When the reverse stage is thus once set up, the line hydraulic pressure from the servo port 112 can be supplied through the three-way check valve 120 to the signal hydraulic pressure chamber 108, and therefore once the reverse stage is set up, the reverse stage disabling valve 100 is maintained in the upper position to maintain the reverse stage, even if the solenoid valve 92 is wrongly operated to open the drain port 94.

Failures of the solenoid valve 92 are most commonly due to a circuit break, and when disabled for such a cause the solenoid valve 92 will be maintained in the closed state. When the solenoid valve 92 is in the closed state the reverse stage disabling valve 100 will not get into the reverse stage disabling state, and therefore, even when the solenoid valve 92 fails and is continually closed, the reverse stage is enabled, that is, the reverse stage disabling state will not occur.

Figure 5:
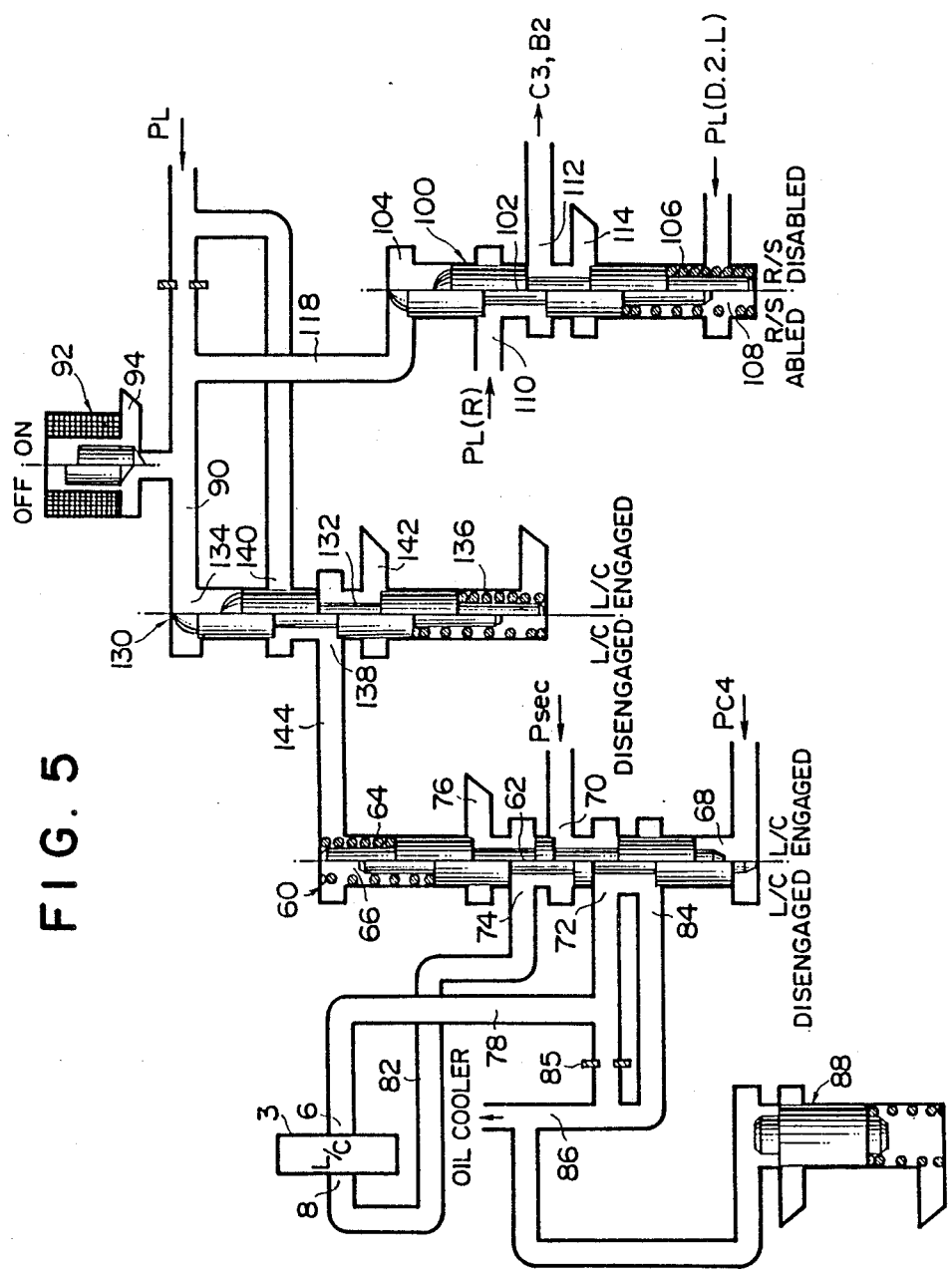

FIG. 5 shows still another embodiment of the hydraulic pressure control device according to the present invention. It should be noted that in FIG. 5 portions corresponding to those shown in FIG. 3 are designated by the same reference numerals in FIG. 3. In this embodiment a normally open type solenoid valve reversed as compared with that in the above described two embodiments is used for the solenoid valve 92, a lock-up control valve 130 is additionally provided, and the reverse stage disabling valve 100 is modified.

The lock-up control valve 130 has a spool element 132 positioned in the upper position as shown in the leftside half portion thereof in the figure by the spring force of a compression coil spring 136 when the signal hydraulic pressure is not supplied to a signal hydraulic pressure chamber 134, whereas when the signal hydraulic pressure is supplied to the signal hydraulic pressure chamber 134 the spool element 132 is moved downward in the figure by that signal hydraulic pressure overcoming the spring force of the compression coil spring 136 and positioned in the lower position as shown in the rightside half portion thereof in the figure. When the spool element 132 is in the upper position, a signal port 138 is connected with a hydraulic pressure inlet port 140, whereas when the spool element 132 is in the lower position, the signal port 138 is connected with a drain port 142. The signal port 138 is connected with the signal hydraulic pressure chamber 66 of the lock-up relay valve 60 by a hydraulic line 144.

Therefore, with regard to the lock-up clutch control, when the solenoid valve 92 is not energized and is therefore open, the spool element 132 of the lock-up control valve 130 is in the upper position, and therefore the signal hydraulic pressure is supplied to the signal hydraulic pressure chamber 66 of the lock-up relay valve 60, and therefore the lock-up clutch 3 is released, whereas when the solenoid valve 92 is energized and is therefore closed, the spool element 132 is positioned in the lower position, and therefore the signal hydraulic pressure is drained from the signal hydraulic pressure chamber 66 of the lock-up relay valve 60, and therefore the spool element 62 of the lock-up relay valve 60 is moved upward if the line hydraulic pressure $P_{C4}$ is supplied, and at this time the lock-up clutch 3 is engaged.

The signal hydraulic pressure chamber 104 of the reverse stage disabling valve 100 is connected with the hydraulic line 90 by the hydraulic line 118, and is selectively supplied with the line hydraulic pressure according to the opening and closing of the solenoid valve 92, while the other signal hydraulic pressure chamber 108 is adapted to be supplied with a hydraulic pressure $P_{L(D,2,L)}$ which is available from the output port 205 of the manual shift valve shown in FIG. 2 when the manual shift valve is set to the D range so that the transmission is able to provide forward speed stages.

The spool element 102 of the reverse stage disabling valve 100 is urged upward in the figure by the compression coil spring 106. In the upper position of the spool element 102, the servo port 112 is connected with the hydraulic pressure input port 110, and the reverse stage is enabled. Therefore, the reverse stage disabling valve 100 enables the reverse stage unless the line hydraulic pressure is supplied to the signal hydraulic pressure chamber 104 by energization of the solenoid valve 92 regardless whether the hydraulic pressure $P_{L(D,2,L)}$ is supplied or not. The hydraulic pressure $P_{L(D,2,L)}$ is absent when the manual shift valve is shifted to the reverse range. When the reverse stage may be set up, the solenoid valve 92 is in the dienergized state and is therefore opened, and therefore the signal hydraulic pressure chamber 104 is drained.

When a manual shift valve was set to the reverse range in error such as during forward traveling of the vehicle, the solenoid valve 92 is energized so as to close the drain port 94 and supply the line hydraulic pressure to the signal hydraulic pressure chamber 104, the spool element 102 of the reverse stage disabling valve 100 is moved to the lower position overcoming the compression coil spring 106 and discharging from the signal hydraulic pressure chamber 108 the hydraulic fluid which may have been supplied therein under the pressure $P_{L(D,2,L)}$ which, however, just disappeared when the manual shift valve was shifted to the reverse range, so as thereby to connect the servo port 112 to the drain port 114 and to prevent the setting up of the reverse stage. The supply of the hydraulic pressure $P_{L(D,2,L)}$ to the signal hydraulic pressure chamber 108 is desirable to balance the hydraulic pressure supplied to the signal hydraulic pressure chamber 104 during forward traveling of the vehicle so that the rise and fall of the hydraulic pressure in the line 90 caused by the energization and dienergization of the solenoid valve for the on and off of the lock-up clutch does not uselessly reciprocate the spool element 102 of the reverse stage disabling valve 100. As a matter of principle for the above-mentioned purpose, the hydraulic pressure $P_{L(D,2,L)}$ need only be available in a certain forward speed stage or stages at which the lock-up clutch is engaged, i.e., for example, in the second, third and fourth speed stages. However, according to the general conventional constructions of the manual shift valve, an output port such as the port 205 which delivers the output hydraulic pressure when the manual shift valve is set to the D range delivers the output hydraulic pressure all through the forward speed stages including the first speed stage. In any event, however, it is not essential to supply the hydraulic pressure $P_{L(D,2,L)}$ to the signal hydraulic pressure chamber 108 as long as the engagement and disengagement control of the lock-up clutch and the reverse stage engagement prevention control are concerned, and the signal hydraulic pressure chamber 108 may be open to a drain passage.

Figure 6:
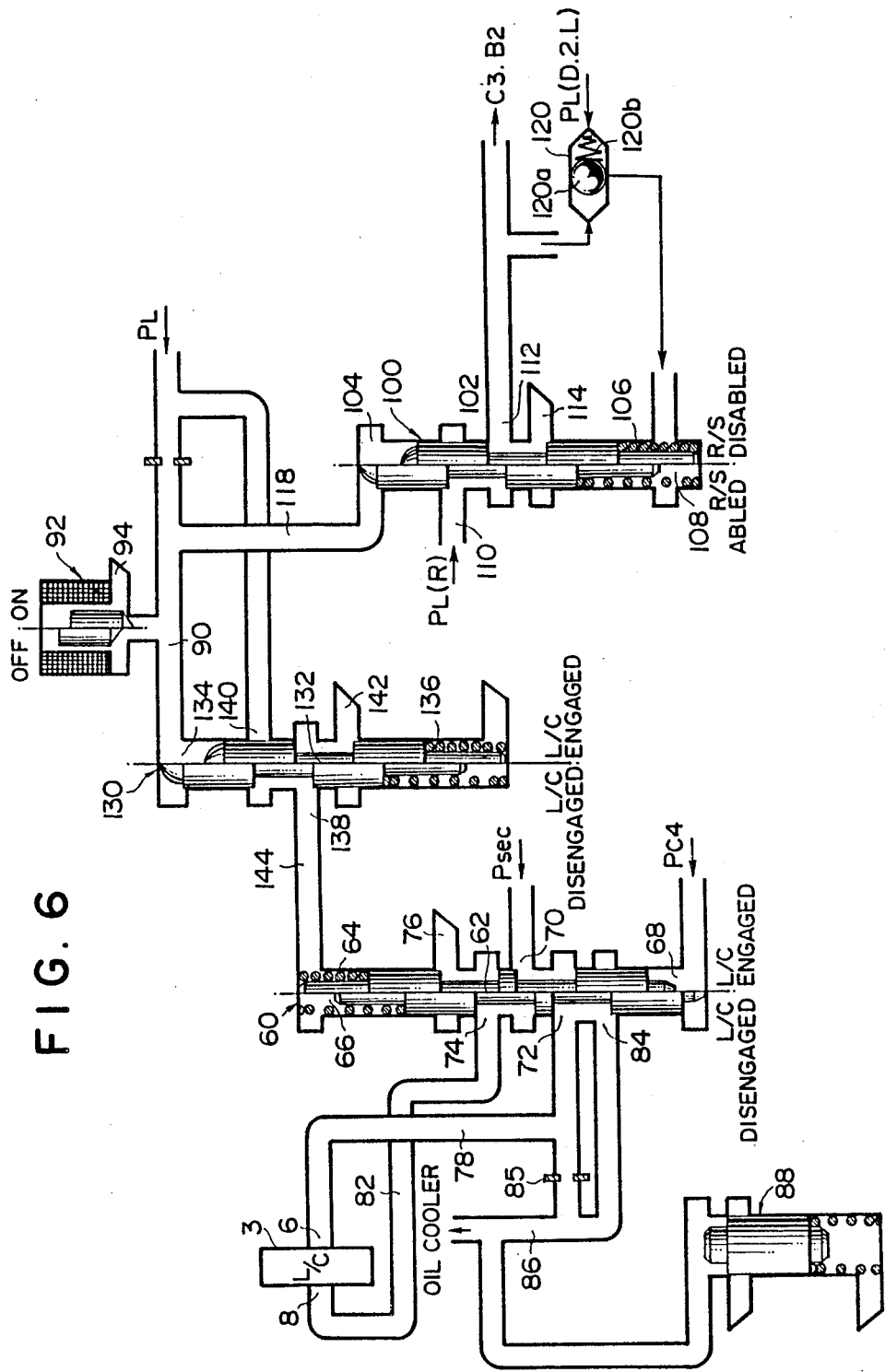

FIG. 6 shows a variant of the embodiment shown in FIG. 5. The variant embodiment shown in FIG. 6 operates in the same manner as that shown in FIG. 4 in that once the reverse stage is enabled, even if the solenoid valve 92 is operated in error in the direction to disable the reverse stage, i.e. energized in error in this case, the reverse stage is maintained, because the hydraulic pressure of the servo port 112 is supplied to the signal hydraulic pressure chamber 108 of the reverse stage disable valve 100 through the three-way check valve 120 of the same structure as the one used in the embodiment shown in FIG. 4.

Also in this embodiment, when the solenoid valve 92 fails because of a circuit break or a similar problem so as continually to be open, the lock-up clutch 3 will be constantly released, and the reverse stage prevention control will remain constantly to enable the reverse stage, that is, the reverse stage disabling state will not occur.

Although the present invention has been described in detail with reference to some particular embodiments thereof, it will be clear to those skilled in the relevent art that various modifications are possible with respect to these embodiments within the scope of the invention.

We claim:

1. A hydraulic pressure control device for an automatic transmission for a vehicle, comprising:
   a manual shift valve for selecting a forward range in which at least one forward speed stage is enabled and a reverse range in which a reverse stage is enabled;
   a first hydraulic pressure control valve having a first and a second control signal port and controlling switching over of an operation of the automatic transmission according to conversion between supply and non supply of a first and a second signal hydraulic pressure to said first and said second control signal port, respectively, said second signal hydraulic pressure being available in a certain forward speed stage or stages but not available in the reverse stage, said first hydraulic pressure control valve being reactive to the conversion between supply and non supply of said first signal hydraulic pressure when and only when said second signal hydraulic pressure is supplied;
   a second hydraulic pressure control valve having a third control signal port and selectively interrupting transmission of a third signal hydraulic pressure according to conversion between supply and non supply of said first signal hydraulic pressure to said third control signal port, said third signal hydraulic pressure being available when and only when the manual shift valve is set to the reverse range and serving to set up the reverse stage; and
   a third hydraulic pressure control valve for controlling the conversion between supply and non supply of said first signal hydraulic pressure so that in the forward speed stage at which said second signal hydraulic pressure is available said operation of the automatic transmission is selectively switched over and in the reverse range the setting up of the reverse stage is selectively interrupted.

2. A hydraulic pressure control device according to claim 1, wherein said first hydraulic pressure control valve is a lock-up clutch relay valve for controlling engagement and disengagement of a lock-up clutch for a torque converter incorporated in the automatic transmission.

3. A hydraulic pressure control device according to claim 1, wherein said third hydraulic pressure control valve is a solenoid valve having a drain port which is normally closed and selectively opened when energized to drain said first signal hydraulic pressure so as to effect the conversion from supply to non supply of said first signal hydraulic pressure to said first and said third control signal port.

4. A hydraulic pressure control device according to claim 3, further comprising a three-way check valve which selectively conducts either said first signal hydraulic pressure or said third signal hydraulic pressure delivered through said second hydraulic pressure control valve to said control signal port of said second hydraulic pressure control valve.

5. A hydraulic pressure control device according to claim 1, wherein said third hydraulic pressure control valve is a solenoid valve having a drain port which is normally opened to drain said first signal hydraulic pressure so as not to supply said first signal hydraulic pressure to said first and said third control signal port and selectively closed when energized so as to effect the conversion from non supply to supply of said first signal hydraulic pressure to said first and said third control signal port.

6. A hydraulic pressure control device according to claim 5, wherein said second hydraulic pressure control valve has a fourth control signal port opposite to said third control signal port, and the hydraulic pressure control device further comprises a three-way check valve which conducts either said third signal hydraulic pressure delivered through said second hydraulic pressure control valve or a hydraulic pressure available in said certain forward speed stage or stages to said fourth control signal port of said second hydraulic pressure control valve.

* * * * *